United States Patent
Akiyama

(10) Patent No.: US 7,362,382 B2
(45) Date of Patent: Apr. 22, 2008

(54) AUTOMATIC GAIN CONTROL CIRCUITRY

(75) Inventor: Takaaki Akiyama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 548 days.

(21) Appl. No.: 11/014,817

(22) Filed: Dec. 20, 2004

(65) Prior Publication Data

US 2005/0185100 A1 Aug. 25, 2005

(30) Foreign Application Priority Data

Feb. 20, 2004 (JP) ............................. 2004-044118

(51) Int. Cl.
*H04N 5/57* (2006.01)

(52) U.S. Cl. .................................................. 348/678

(58) Field of Classification Search ................ 348/678, 348/679, 682, 255, 687, 683, 673, 645, 655
See application file for complete search history.

(56) References Cited

U.S. PATENT DOCUMENTS

| | | | | |
|---|---|---|---|---|
| 3,790,706 A | * | 2/1974 | Gubala et al. | ............... 348/572 |
| 3,936,870 A | * | 2/1976 | Nakamura | ................... 348/680 |
| 3,947,631 A | * | 3/1976 | Rhee et al. | ................. 348/607 |
| 3,970,777 A | * | 7/1976 | Bradford et al. | ............ 348/673 |
| 4,612,662 A | * | 9/1986 | Kuwajima et al. | ............ 381/10 |
| 4,680,624 A | * | 7/1987 | Murakami | ................... 348/256 |
| 5,321,526 A | * | 6/1994 | Takenaka | ..................... 358/464 |
| 5,396,300 A | * | 3/1995 | Kageyama | ................... 348/678 |
| 5,406,336 A | * | 4/1995 | Harlos et al. | ............... 348/673 |
| 5,512,948 A | * | 4/1996 | Iwamatsu | ................... 348/255 |

FOREIGN PATENT DOCUMENTS

| | | |
|---|---|---|
| JP | 08-322003 | 12/1996 |
| JP | 10-164458 | 6/1998 |

OTHER PUBLICATIONS

Matsunaga, Japanese Office Action, Reference No. SA003858, Feb. 7, 2006, Japan.

* cited by examiner

*Primary Examiner*—Paulos M. Natnael
(74) *Attorney, Agent, or Firm*—Donald R. Studebaker; Nixon Peabody LLP

(57) ABSTRACT

To provide an automatic gain control circuitry which effectively works for a video signal of which pedestal level in an effective video period is different from the pedestal level in the vertical blanking period. The automatic gain control circuitry comprises a first pedestal level detection part to detect a synchronizing level in the vertical blanking period of the video signal, a second pedestal level detection part to detect a synchronizing level in an effective video period of the video signal, and a ratio determination part to determine a ratio between the value detected by the first pedestal level detection part and the value detected by the second pedestal level detection part and multiplying the ratio to a standard value of the synchronizing value in the vertical blanking period for outputting the obtained value as the reference synchronizing level.

4 Claims, 13 Drawing Sheets

FIG. 3A
A/D CONVERTED VIDEO SIGNAL
(COMPOSITE SIGNAL)
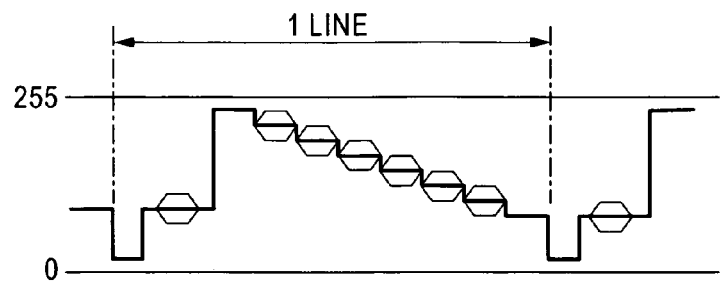
FIG. 3B
Y/C SEPARATED VIDEO SIGNAL
(LUMINANCE SIGNAL Y)
FIG. 3C
SYNC TIP LEVEL DETECTION TIMING
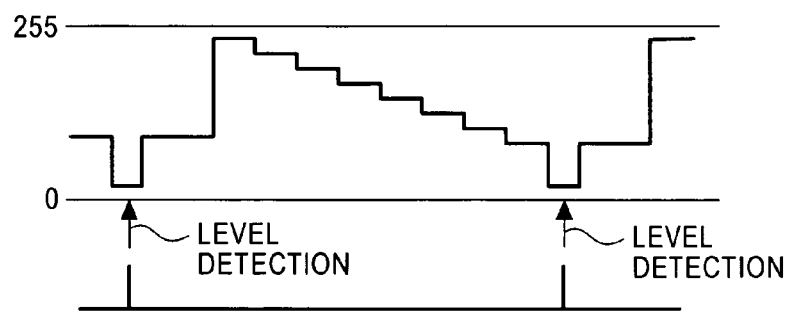
FIG. 3D
LUMINANCE SIGNAL AFTER SYNC TIP LEVEL IS SUBTRACTED
(LUMINANCE SIGNAL Y1)
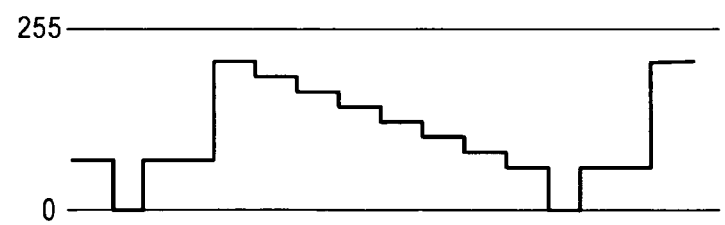

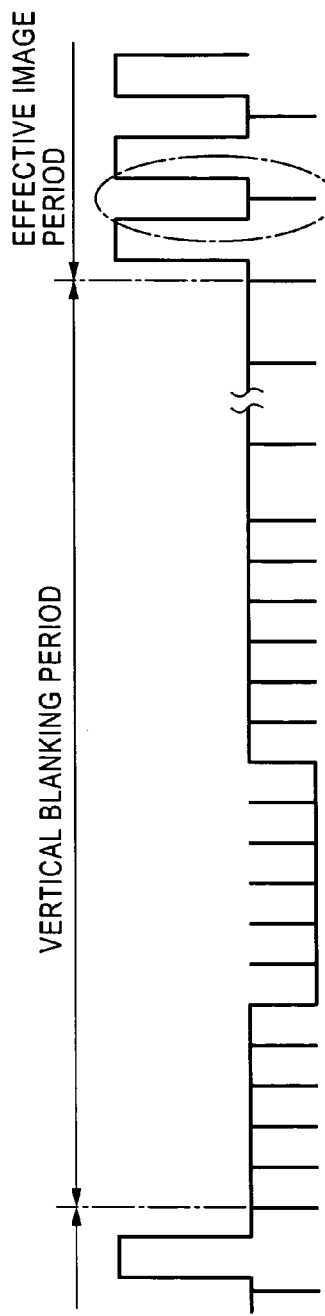
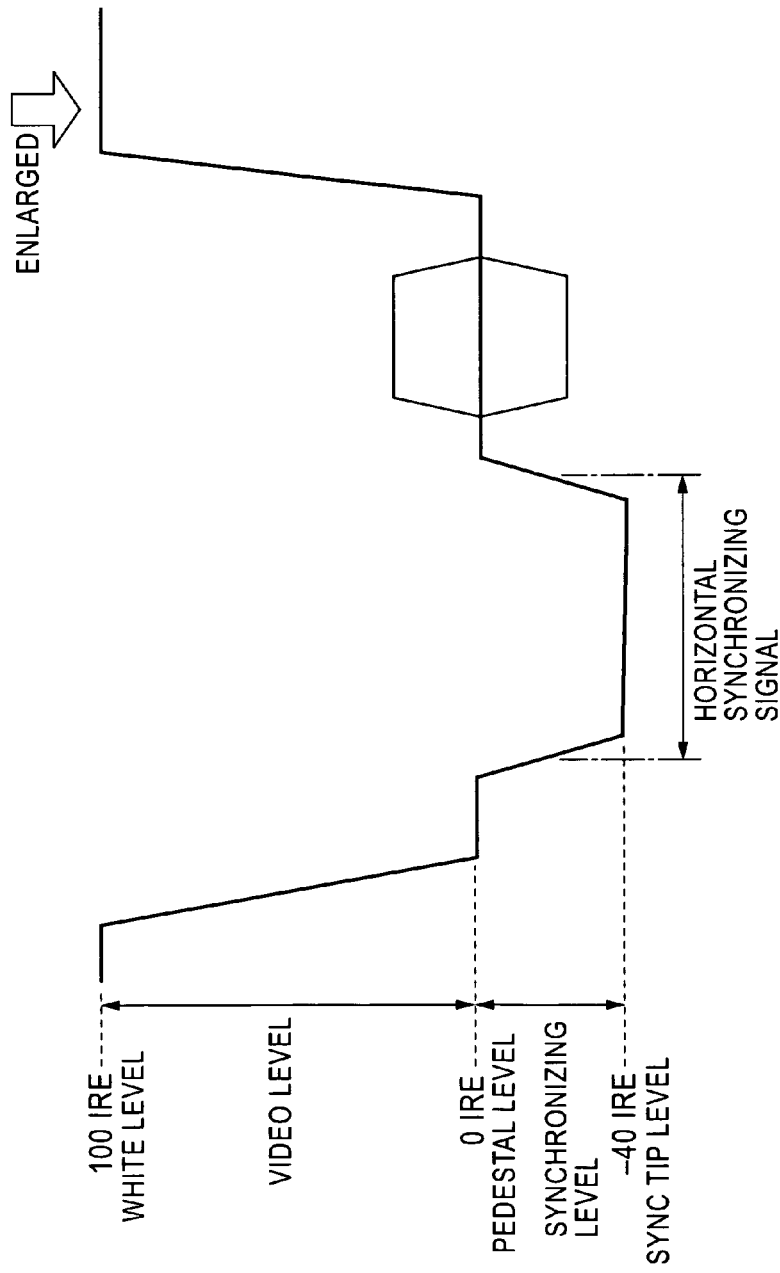
FIG. 5A
FIG. 5B

FIG. 8

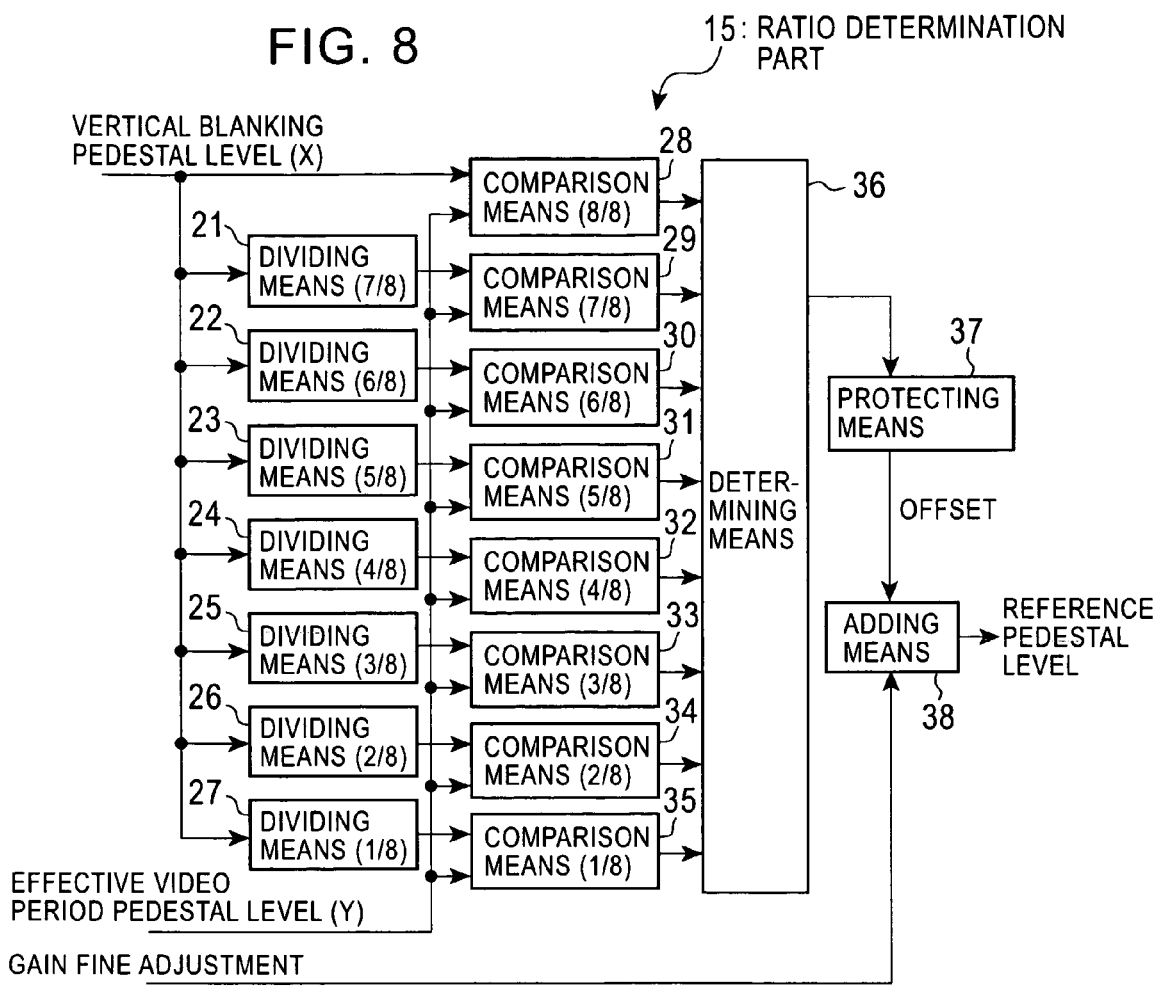

DETERMINATION CIRCUIT
    COMPARISON MEANS 8/8 DETERMINES THE PEDESTAL LEVEL IN THE EFFECTIVE VIDEO PERIOD IS LARGER THAN THE LEVEL.: OFFSET = 40 IRE
    COMPARISON MEANS 8/8 DETERMINES THE PEDESTAL LEVEL IN THE EFFECTIVE VIDEO PERIOD IS SMALLER THAN THE LEVEL.: OFFSET = 40 IRE
    COMPARISON MEANS 7/8 DETERMINES THE PEDESTAL LEVEL IN THE EFFECTIVE VIDEO PERIOD IS SMALLER THAN THE LEVEL.: OFFSET = 35 IRE
    COMPARISON MEANS 6/8 DETERMINES THE PEDESTAL LEVEL IN THE EFFECTIVE VIDEO PERIOD IS SMALLER THAN THE LEVEL.: OFFSET = 30 IRE
    COMPARISON MEANS 5/8 DETERMINES THE PEDESTAL LEVEL IN THE EFFECTIVE VIDEO PERIOD IS SMALLER THAN THE LEVEL.: OFFSET = 25 IRE
    COMPARISON MEANS 4/8 DETERMINES THE PEDESTAL LEVEL IN THE EFFECTIVE VIDEO PERIOD IS SMALLER THAN THE LEVEL.: OFFSET = 20 IRE
    COMPARISON MEANS 3/8 DETERMINES THE PEDESTAL LEVEL IN THE EFFECTIVE VIDEO PERIOD IS SMALLER THAN THE LEVEL.: OFFSET = 15 IRE
    COMPARISON MEANS 2/8 DETERMINES THE PEDESTAL LEVEL IN THE EFFECTIVE VIDEO PERIOD IS SMALLER THAN THE LEVEL.: OFFSET = 10 IRE
    COMPARISON MEANS 1/8 DETERMINES THE PEDESTAL LEVEL IN THE EFFECTIVE VIDEO PERIOD IS SMALLER THAN THE LEVEL.: OFFSET = 5 IRE

AUTOMATIC GAIN CONTROL CIRCUITRY

BACKGROUND OF THE INVENTION

1. Field of the Invention

The present invention relates to a luminance signal automatic gain control (AGC) unit of a digital video decoder for decoding a video signal.

2. Description of the Related Art

Digital video decoders comprise an AGC circuitry in order to obtain a stable output even if the amplitude of an input signal is varied.

FIG. 1 is a block diagram of a conventional AGC circuitry.

As shown in the figure, the conventional AGC circuitry comprises an AGC preprocessing circuit 101 and an AGC circuit 102.

The AGC preprocessing circuit 101 receives a composite signal and a sync tip detecting signal to output a luminance signal Y.

FIG. 2 is a block diagram of a conventional AGC preprocessing circuit.

As shown in FIG. 2, the AGC preprocessing circuit includes an analog to digital conversion part 103, a Y/C separation part 104, a sync tip level detection part 105, and a sync tip level subtracter part 106. A functional overview for each part will be described with reference to the drawings.

FIGS. 3A to 3D are waveform diagram of a video signal illustrating the function of a conventional AGC preprocessing circuit.

FIG. 3A is a view explaining the function of the analog to digital conversion part 103 of FIG. 2. As shown in FIG. 3A, the analog to digital conversion part 103 receives an analog composite signal for A/D conversion and outputs a digital composite signal. The figure shows that an analog composite signal is converted into a digital composite signal scaled in 8 bits for 255 values. As shown in the figure, the amplitude of the digital composite signal A/D-converted is attenuated to narrower range than the range of 255 values. It is a role of a luminance signal AGC circuit to automatically amplify the amplitude to the range of 255 values.

FIG. 3B is a view explaining function of the Y/C separation part 104 of FIG. 2. As shown in FIG. 3B, the Y/C separation part 104 receives an 8-bit digital composite signal from the analog to digital conversion part 103. The Y/C separation part 104 then separates the received signal into a color signal and a luminance signal Y to output only an 8-bit luminance signal.

FIG. 3C is a view explaining function of the sync tip level detection part 105 of FIG. 2. As shown in FIG. 3C, the sync tip level detection part 105 detects the sync tip level of the 8-bit luminance signal Y received from the Y/C separation part 104 in matching with the timing of reception of the sync tip detecting signal from outside.

FIG. 3D is a view explaining function of the sync tip level subtracter part 106 of FIG. 2. As shown in FIG. 3D, the sync tip level subtracter part 106 receives the 8-bit luminance signal Y from the Y/C separation part 104, and subtracts the sync tip level which is detected by the sync tip level detection part 105 from the luminance signal Y. By subtracting the sync tip level from the 8-bit luminance signal Y, the 8-bit luminance signal Y is level-shifted as a whole so that the sync tip reaches the axis of zero.

Referring again to FIG. 1, the AGC circuit 102 includes a gain multiplying part 107, a pedestal level detection part 108, and a gain calculation part 109. A Functional overview for each part will be described with reference to the drawings.

The gain multiplying part 107 receives the luminance signal Y from the AGC preprocessing circuit 101. The gain multiplying part 107 then amplifies the amplitude of the luminance signal $Y\alpha 1$-fold to output the resultant luminance signal $Y\alpha 1$.

The pedestal level detection part 108 receives a pedestal level detecting signal to detect a pedestal level of the luminance signal $Y\alpha 1$.

FIG. 4 is a diagram explaining function of a conventional pedestal level detection part.

As shown in the figure, the pedestal level detection part 108 calculates the average of the pedestal level of the luminance signal $Y\alpha 1$ corresponding N pixels before a pedestal level detecting signal is received in matching with the reception of the pedestal level detection signal. The averaged pedestal level is then output as the pedestal level of the luminance signal $Y\alpha 1$, which represents a synchronizing level, since the sync tip level of the pedestal level is shifted to the value of zero in 8 bits (FIG. 3D).

The gain calculation part 109 receives the averaged value of the pedestal level from the pedestal level detection part 108 and estimates an amplitude level of the luminance signal $Y\alpha 1$. From the estimation result, the gain calculation part 109 calculates an amplification factor $\alpha 2$, and transmits it to the gain multiplying part 107. The explanation of the form of a video signal based on the IRE reference UNIT is explained here, though in the course of the explanation of the gain calculation part 109.

FIGS. 5A and 5B are schematic diagrams explaining a video signal.

FIG. 5A is a view explaining the change of a video signal in a vertical blanking period and an effective video period. FIG. 5B is a view explaining the form of a video signal.

In the video signal as shown in FIG. 5B, the pedestal level is set to 0 IRE, the picture level is in the plus direction, and the synchronizing level is in the minus direction. The white level goes to approximately 100 IRE and the sync tip level goes to approximately −40 IRE. Since the sync tip level is approximately −40 IRE, the synchronizing level is 40 IRE, which equals to value of 64 in 8 bits.

Referring again to FIG. 1, the gain calculation part 109 receives the pedestal level of the luminance signal $Y\alpha 1$ from the pedestal level detection part 108. The gain calculation part 109 then compares the pedestal level with a comparison reference of the value of 40 IRE. In the conventional art, the value of 40 IRE is held in the gain calculation part 109. From the comparison result, the gain calculation part 109 calculates the amplification factor $\alpha 2$ which is used to amplify the amplitude of the luminance signal $Y\alpha 1$ to the level shown in FIG. 5B and transmits the factor $\alpha 2$ to the gain calculation part. It should be noted here that the pedestal level of the luminance signal $Y\alpha 1$ received from the pedestal level detection part 108 represents the synchronizing level of the luminance signal $Y\alpha 1$, and that the comparison reference 40 IRE represents the magnitude of the synchronizing signal in a standard video signal.

In other words, the gain calculation part 109 receives the synchronizing level of the luminance signal $Y\alpha 1$ and calculates the amplification factor to make the synchronizing level match the synchronizing level of a standard video signal. As a result of the multiplication of the luminance signal $Y\alpha 1$ by the amplification factor $\alpha 2$ determined in this way, the synchronizing level of the luminance signal $Y\alpha 1\alpha 2$ is equalized to the synchronizing level of the standard video signal. In addition, the video level of the luminance signal Yα1α2 is also equalized to the video level of the standard video signal since the ratio between the video level and the synchronizing level stay constant.

In this process, if the luminance signal Yα1 is just multiplied by the amplification factor α2 in the gain multiplying part 107, a rapid change may occur and a screen may be affected. Thus, the amplification factor α2 is usually disassembled into the form of α2=β1·β2 ... βn for amplifying the luminance signal Yα1 to the luminance signal Yα1α2 step by step at n times.

In recent years, a variety of types of video equipment have been developed. Those video equipment types sometimes use video signals of which sync tip level is different from −40 IRE (e.g. −30 IRE). In a prior art, whenever the sync tip level of the video signal used in an video equipment is different from −40 IRE, a gain offset set in the gain calculation part 109 should be manually adjusted. However, the number of types of video equipment have been rapidly increased. Recently, there is video equipment using different values of sync tip levels between the vertical blanking period and the effective video period, for example, −30 IRE in the effective video period, while −40 IRE in the vertical blanking period. The conventional technique to manually adjust them cannot cope with such a situation.

The prior art is disclosed in Japanese Patent Kokai No. 8-322003 (patent document 1).

In the prior art, whenever video apparatus applies a video signal having a sync tip level different from a standard one, that is −40 IRE, a reference for comparison set in a gain calculation part of a video equipment should be manually adjusted. A problem has been encountered that it is difficult to manually adjust the video apparatus of which sync tip levels in an effective video period and a vertical blanking period are different from each other.

SAMMARY OF THE INVENTION

The AGC circuit is provided with a first pedestal level detection part for detecting a synchronizing level in a vertical blanking period of a video signal, a second pedestal level detection part for detecting a synchronizing level in an effective video period of a video signal, and a ratio determination part for calculating a ratio between a detected values by the first pedestal level detection part and the second pedestal level detection part, and outputting a value which is obtained by multiplying a standard value of the synchronizing level in the vertical blanking period to the ratio, as a standard synchronizing level.

The AGC unit of the present invention calculates a ratio R=Y/X, which is the ratio between a pedestal level X in the vertical blanking period and a pedestal level Y in the effective video period of the received video signal Y to generate a reference pedestal level based on the calculated ratio R. Thus, no matter how the pedestal level Y in the effective video period is set for the pedestal level X, which is usually fixed to 40 IRE, in the vertical blanking period, it is possible to calculate a proper amplification factor α2. Thus, it is possible to provide an AGC circuitry which effectively works even if the pedestal level in the effective video period is different from the pedestal level in the vertical blanking period.

The AGC circuitry comprises a plurality of dividing means to divide and output the detected value by the first pedestal level detection part into a plurality of stages respectively having determined level differences, a plurality of comparing means to compare the respective outputs from the plurality of dividing means with the detected value from the second pedestal level detection part and output the comparison results, and determining means to determine the ratio between the detected values from the first and second pedestal level detection parts based on the outputs from the plurality of comparing means. A proper amplification factor is obtained by multiplying the ratio determined by the determining means by the standard value of the synchronizing level in the vertical blanking period.

BRIEF DESCRIPTION OF THE DRAWINGS

FIGS. 3A to 3D are views explaining function of the conventional AGC preprocessing circuit;

FIGS. 5A and 5B are views explaining a video signal;

FIG. 8 is a block diagram of a ratio determining part;

DETAILED DESCRIPTION OF THE INVENTION

In the standard video signal, as described in the paragraphs titled "Background Art," the pedestal level is set at 0 IRE. The picture level is set in the plus direction, and the sync level is set in the minus direction. The white level is set at 100 IRE and the sync tip level is set at −40 IRE (FIG. 5B). Furthermore, the sync tip level in the effective video period is equally set with the sync tip level in the vertical blanking period. However, in a nonstandard video signal, a sync tip level in the effective video period may be different from the sync tip level in the vertical blanking period.

It is an object of the first embodiment of the present invention to provide an AGC circuit which properly works even if the sync tip level in the effective video period is different from the sync tip level in the vertical blanking period. Through the following description, in a nonstandard video signal which is subject to an automatic gain control, the sync tip level in the vertical blanking period is fixed to a constant value, e.g. −40 IRE, and the sync tip level of the effective video period is modified to be at a predetermined value, e.g. −30 IRE, which is higher than the sync tip level of the vertical blanking period.

Figure 6:
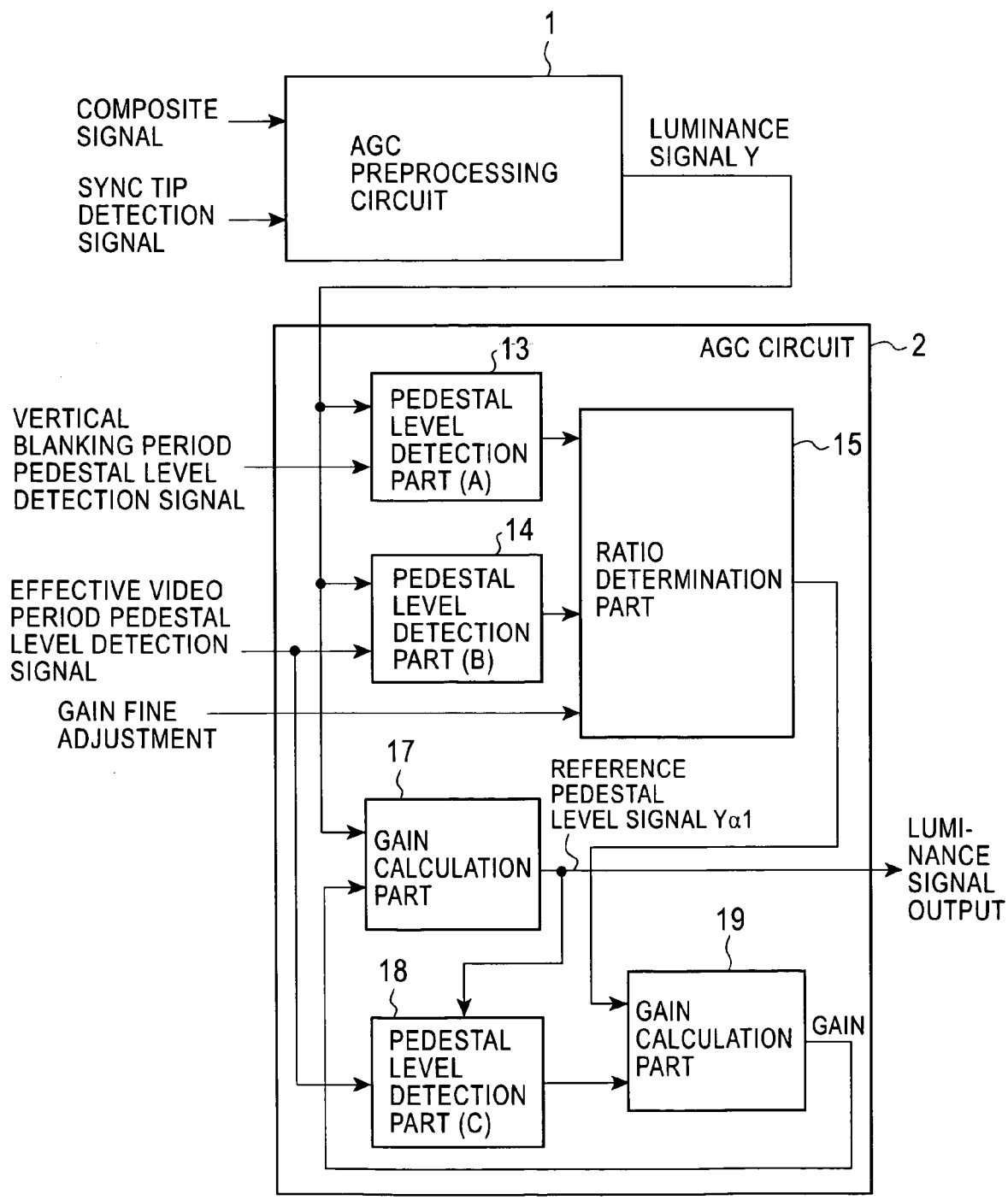
FIG. 6 is a block diagram of an AGC unit of the first embodiment of the present invention.

FIG. 6 is a block diagram of the first embodiment representing the AGC unit of the present invention.

As shown in the figure, the AGC unit of the first embodiment includes an AGC preprocessing circuit 1 and an AGC circuit 2.

FIGS. 7A to 7E are views explaining the AGC preprocessing circuit.

The AGC preprocessing circuit 1 receives a composite signal and a sync tip detection signal to output a luminance signal Y. Since the AGC circuitry of the present embodiment uses a similar AGC preprocessing circuit to one described in Background Art, only the outline will be described here.

Figure 7:
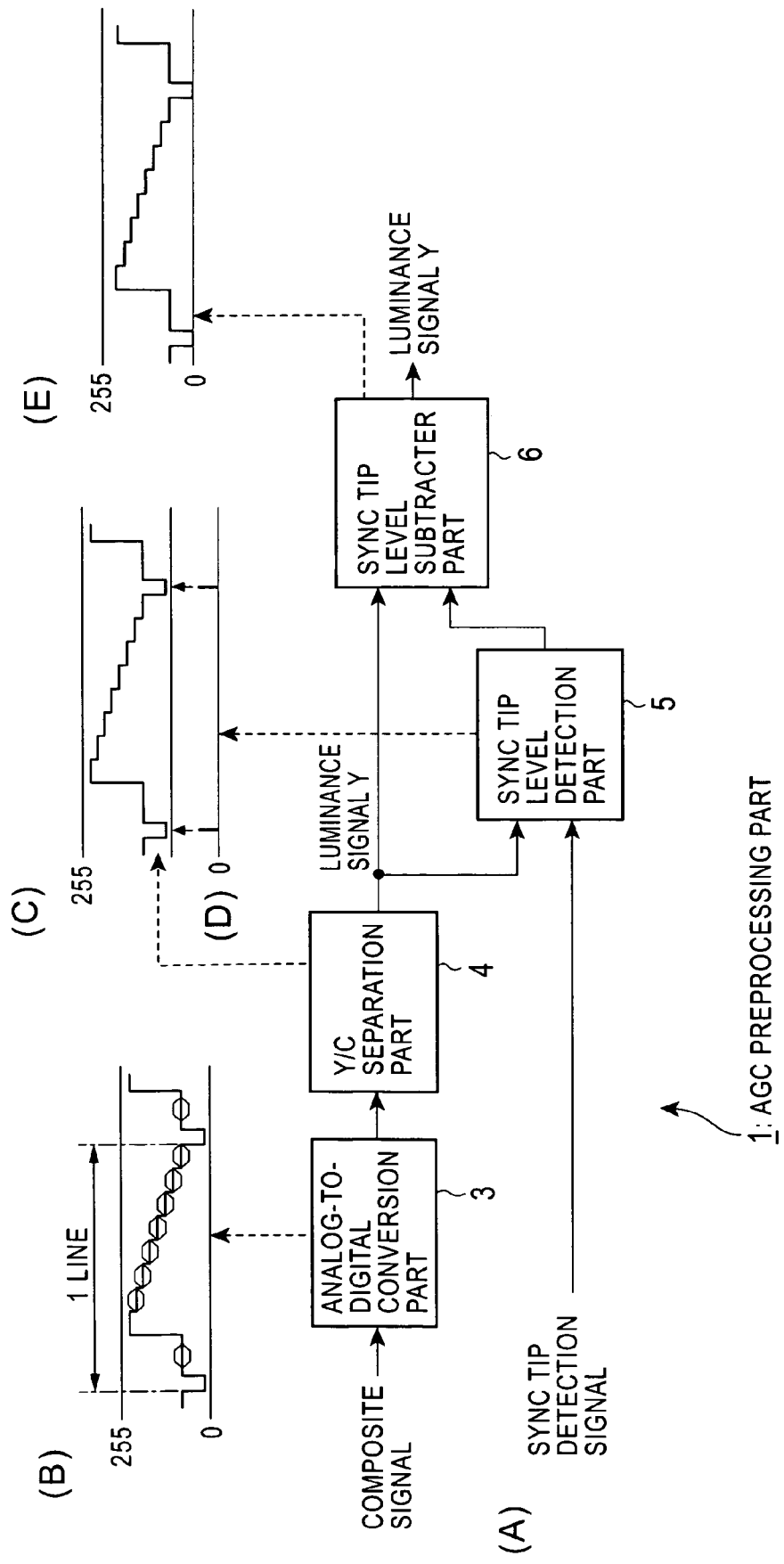
FIGS. 7A to 7E are views explaining function of the AGC preprocessing circuit.

FIG. 7A is a block diagram representing the AGC preprocessing circuit. FIGS. 7B, 7C, 7D and 7E respectively show signal waveforms of various parts.

As shown in FIG. 7A, the AGC preprocessing circuit 1 has an analog to digital converter 3, a Y/C separation part 4, a sync tip level detection part 5, and a sync tip level subtracter part 6.

The analog to digital conversion part 3 receives an analog composite signal for A/D conversion and outputs a digital composite signal. Like FIG. 3A, FIG. 7B is a view representing a digital composite signal scaled in 8 bits, for example, for 255 values, converted from an analog composite signal. As shown in the figure, the amplitude of the A/D-converted digital composite signal is attenuated below the level of 255. It is a role of a luminance signal AGC circuit to automatically amplify the amplitude to the value of 255.

The Y/C separation part 4 receives a digital composite signal composed of 8 bits from the analog to digital conversion part 103. The Y/C separation part 4 separates the received signal into a color signal and a luminance signal Y to output only the 8 bit luminance signal Y. Like FIG. 3B, FIG. 7C is a view showing the 8-bit luminance signal Y represented at 255 values.

The sync tip level detection part 5 detects a sync tip level of the luminance signal Y scaled in 8 bits received from the Y/C separation part 4 in matching with a sync tip level detecting signal received from outside. Like FIG. 3C, FIG. 7D shows that a level detection is matched with the sync tip of the 8-bit luminance signal Y.

The sync tip level subtracter part 6 receives the 8-bit luminance signal Y from the Y/C separation part 4 and subtracts the sync tip level, which is detected by the sync tip level detection part 5, from the luminance signal Y. By subtracting the sync tip level from the 8-bit luminance signal Y, the 8-bit luminance signal Y is level-shifted as a whole so that the sync tip reaches the value of zero, as in the case shown in FIG. 3D.

As described above, the AGC preprocessing circuit 1 draws a luminance signal Y of which sync tip is shifted to the value of zero from a composite signal, and transmits the luminance signal Y to the AGC circuit 2 of FIG. 6 which will be described below.

Referring again to FIG. 6, the AGC circuit 2 has a pedestal level detection part (A) 13, a pedestal level detection part (B) 14, a ratio determination part 15, a gain multiplying part 17, a pedestal level detection part (C) 18, and a gain calculating part 19.

The pedestal level detection part (A) 13 detects a pedestal level, which corresponds to a synchronizing level, of a luminance signal Y in a vertical blanking period (FIG. 5A) in matching with a reception of a vertical blanking period pedestal level detecting signal received from outside. In this detection, as described in the description of Background Art, the pedestal level detection part (A) 13 calculates an average of the pedestal level corresponding N pixels before reception of the vertical blanking period pedestal level detection signal, and outputs a resultant value as a pedestal level X of the luminance signal Y of the vertical blanking period.

The pedestal level detection part (B) 14 detects a pedestal level, which corresponds to a synchronizing level, of a luminance signal Y in an effective video period (FIG. 5A) in accordance with the reception of an effective video period pedestal level detecting signal received from outside. In this detection, as described in the description of Background Art, the pedestal level detection part (B) 14 calculates an average of the pedestal level corresponding N pixels before the reception of the effective video period pedestal level detection signal, and outputs a result thereof as a pedestal level of the luminance signal Y in the effective video period.

The ratio determination part 15 calculates the ratio $R=Y/X$ between the pedestal level X, which is detected by the pedestal level detection part (A) 13 for a video signal received during the vertical blanking period, and a pedestal level Y, which is detected by the pedestal level detection part (B) 14 for a video signal received during the effective video period. The ratio determination part 15 then outputs a reference pedestal level based on the ratio R. The ratio determination part 15 will be described below in detail with reference to the drawings.

FIG. 8 is a block diagram of the ratio determination part 15.

As shown in the drawing, the ratio determination part 15 has dividing means (7/8) 21, dividing means (6/8) 22, dividing means (5/8) 23, dividing means (4/8) 24, dividing means (3/8) 25, dividing means (2/8) 26, dividing means (1/8) 27, comparing means (8/8) 28, comparing means (7/8) 29, comparing means (6/8) 30, comparing means (5/8) 31, comparing means (4/8) 32, comparing means (3/8) 33, comparing means (2/8) 34, comparing means (1/8) 35, determining means 36, protection means 37, and addition means 38.

The dividing means (7/8) 21 receives a pedestal level X in the vertical blanking period from the pedestal level detection part (A) 13, performs a division, and outputs a level (7/8)X.

The dividing means (6/8) 22 receives a pedestal level X in the vertical blanking period from the pedestal level detection part (A) 13, performs a division, and outputs a level (6/8)X.

The dividing means (5/8) 23 receives a pedestal level X in the vertical blanking period from the pedestal level detection part (A) 13, performs a division, and outputs a level (5/8)X.

The dividing means (4/8) 24 receives a pedestal level X in the vertical blanking period from the pedestal level detection part (A) 13, performs a division, and outputs a level (4/8)X.

The dividing means (3/8) 25 receives a pedestal level X in the vertical blanking period from the pedestal level detection part (A) 13, performs a division, and outputs a level (3/8)X.

The dividing means (2/8) 26 receives a pedestal level X in the vertical blanking period from the pedestal level detection part (A) 13, performs a division, and outputs a level (2/8)X.

The dividing means (1/8) 27 receives a pedestal level X in the vertical blanking period from the pedestal level detection part (A) 13, performs a division, and outputs a level (1/8)X.

The comparing means (8/8) 28 compares the pedestal level Y in the effective video period received from the pedestal level detection part (B) 14 and the pedestal level X in the vertical blanking period received from the pedestal level detection part (A) 13 and outputs the comparison result thereof.

The comparing means (7/8) 29 compares the pedestal level Y in the effective video period received from the pedestal level detection part (B) 14 with the level (7/8)X received from the dividing means (7/8) 21 and outputs the comparison result thereof.

The comparing means (6/8) 30 compares the pedestal level Y in the effective video period received from the pedestal level detection part (B) 14 with the level (6/8)X received from the dividing means (6/8) 22 and outputs the comparison result thereof.

The comparing means (5/8) 31 compares the pedestal level Y in the effective video period received from the pedestal level detection part (B) 14 with the level (5/8)x received from the dividing means (5/8) 23 and outputs the comparison result thereof.

The comparing means (4/8) 32 compares the pedestal level Y in the effective video period received from the pedestal level detection part (B) 14 with the level (4/8)X received from the dividing means (4/8) 24 and outputs the comparison result thereof.

The comparing means (3/8) 33 compares the pedestal level Y in the effective video period received from the pedestal level detection part (B) 14 with the level (3/8)X received from the dividing means (3/8) 25 and outputs the comparison result thereof.

The comparing means (2/8) 34 compares the pedestal level Y in the effective video period received from the pedestal level detection part (B) 14 with the level (2/8)X received from the dividing means (2/8) 26 and outputs the comparison result thereof.

The comparing means (1/8) 35 compares the pedestal level Y for the effective video period received from the pedestal level detection part (B) 14 with the level (1/8)X received from the dividing means (1/8) 35 and outputs the comparison result thereof.

The determining means 36 outputs an offset level on the basis of the comparison results from the eight comparing means.

The determining means 36 outputs the offset value of 40 IRE, when Y>X is input from the comparing means (8/8) 28. The determining means 36 also outputs the offset value of 40 IRE, when Y<X is input from the comparing means (8/8) 28 and Y>(7/8)X is input from the comparing means (7/8) 29. The determining means 36 outputs an offset value of 35 IRE, when Y<(7/8)X is input from the comparing means (7/8) 29 and Y>(6/8)X is input from the comparing means (6/8) 30.

The determining means 36 outputs an offset value of 30 IRE, when Y<(6/8)X is input from the comparing means (6/8) 30 and Y>(5/8)X is input from the comparing means (5/8) 31. The determining means 36 outputs an offset value of 25 IRE, when Y<(5/8)X is input from the comparing means (5/8) 31 and Y>(4/8)X is input from the comparing means (4/8) 32.

The determining means 36 outputs an offset value of 20 IRE, when Y<(4/8)X is input from the comparing means (4/8) 32 and Y>(3/8)X is input from the comparing means (3/8) 33. The determining means 36 outputs an offset value of 15 IRE, when Y<(3/8)X is input from the comparing means (3/8) 33 and Y>(2/8)X is input from the comparing means (2/8) 34.

The determining means 36 outputs an offset value of 10 IRE, when Y<(2/8)X is input from the comparing means (2/8) 34 and Y>(1/8)X is input from the comparing means (1/8) 35.

The determining means 36 outputs an offset value of 5 IRE, when Y<(1/8)X is input from the comparing means (1/8) 35.

The following points should be noted here.

Since there is a predetermined time difference between the vertical blanking period and the effective video period, a value which is temporarily stored in a register (not shown) is used for either pedestal level in those periods. Thus, the ratio determination part 15 determines the ratio between the pedestal levels in the effective video period and the vertical blanking period, i.e., the ratio between the heights in the synchronizing levels, and outputs an offset level corresponding to the ratio. Moreover, since the pedestal level of the vertical blanking period is fixed to the value of 40 IRE in accordance with the precondition of the present embodiment described before, the determining means 36 outputs the pedestal level in the effective video period. This offset level corresponds to a synchronizing level of the nonstandard video signal which is subjected by the AGC circuit of the present embodiment.

The protecting means 37 receives an output from the determining means 36 M-times and successively checks if those outputs are the identical value for updating an offset level M-times. The M-times successive checks if those outputs are of the same value can prevent an erroneous determination due to the influence of a noise. M=4 is usually selected.

The adding means 38 fine-adjusts the offset level updated by the protecting means 37. The fine-adjusted offset level becomes the reference pedestal level. This reference pedestal level represents the synchronizing level of the nonstandard video signal to be subject to an automatic gain control in this embodiment.

In this way, the ratio determination part 15 obtains the reference pedestal level in the effective video period of the composite signal input to the AGC preprocessing circuit, and transmits the reference pedestal level to the gain calculation part 19.

The gain multiplying part 17 receives the luminance signal Y from the AGC preprocessing circuit 1. The gain multiplying part 17 then amplifies the amplitude of the luminance signal Y$\alpha$1-fold and outputs the resultant luminance signal Y$\alpha$1. A luminance signal Y$\alpha$1$\alpha$2 amplified to the determined value is output as the gain controlled luminance signal, as will be described below.

Figure 4:
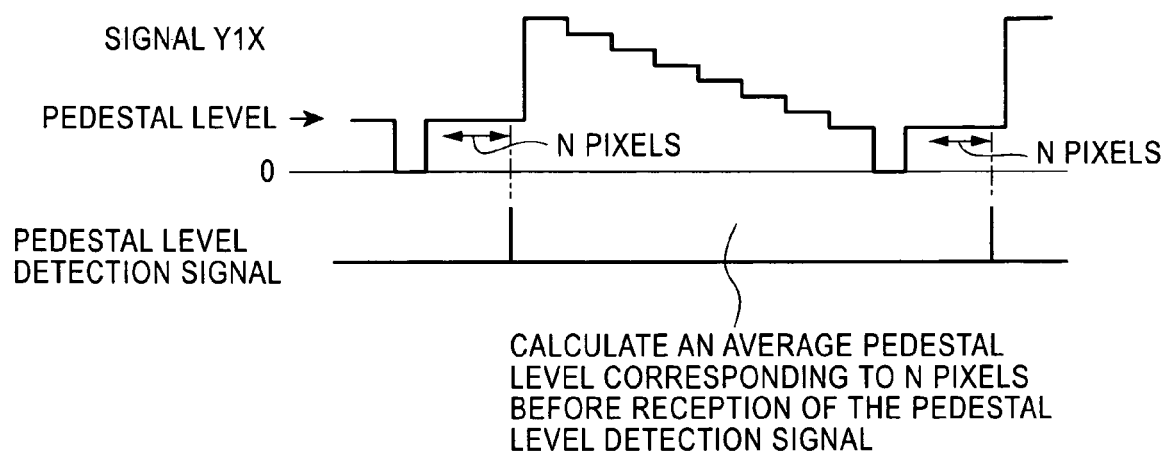
FIG. 4 is a view explaining function of a conventional pedestal level detection part.

The pedestal level detection part (C) 18 receives the effective video period pedestal detection signal and detects the pedestal level of the luminance signal Y$\alpha$1. Using a method similar to that described with referring to FIG. 4, the pedestal level detection part (C) 18 calculates an average of the pedestal level corresponding N pixels of the luminance signal Y$\alpha$1 before the effective video period pedestal level detection signal is received, and outputs the averaged pedestal level as a pedestal level of the detected luminance signal Y$\alpha$1, i.e., the height of the synchronizing signal of the luminance signal Y$\alpha$1.

The gain calculation part 19 receives the detected value of the pedestal level from the pedestal level detection part 18, and compares it with the reference pedestal level in the effective video period received from the ratio determination part 15. The gain calculation part 19 then calculates an amplification factor $\alpha$2 for obtaining the gain-controlled luminance signal Y$\alpha$1$\alpha$2 and transmits the amplification factor $\alpha$2 to the gain calculation part 17.

In other words, the gain calculation part 19 receives the magnitude of the synchronizing signal, i.e., the synchronizing level, of the luminance signal Y$\alpha$1 and calculate the amplification factor to make the magnitude thereof equal to the magnitude of the synchronizing signal of the nonstandard video signal which is subject to the present embodiment.

By multiplying the luminance signal $Y\alpha1$ by the amplification factor $\alpha2$ determined in this way, the magnitude of the synchronizing signal of the luminance signal $Y\alpha1\alpha2$ also equals to the magnitude of the synchronizing signal of the standard video signal. Moreover, since the ratio between the absolute amount of the white level and the absolute amount of the synchronizing level stays constant, the video level of the luminance signal $Y\alpha1\alpha2$ also equals to the video level of the standard video signal. In this process, if the luminance signal $Y\alpha1$ is just multiplied by the amplification factor $\alpha2$ in the gain multiplying part 17, a rapid change may occur and a screen may be affected. Thus, the amplification factor $\alpha2$ is usually disassembles into the form of $\alpha2=\beta1\cdot\beta2\ldots\beta n$ to amplify the luminance signal $Y\alpha1$ to the luminance signal $Y\alpha1\alpha2$ n times step by step.

As described above, in the AGC unit of the first embodiment, the ratio determination part 15 calculates the ratio $R=Y/X$ between the pedestal level X in the vertical blanking period and the pedestal level Y in the effective video period of the received video signal Y. The AGC unit then generates a reference pedestal level based on the ratio R. Accordingly, what value the pedestal level Y in the effective video period is set for the pedestal level X which is usually fixed to the value of 40 IRE, it is possible for the AGC unit to calculate a proper amplification factor $\alpha2$. Consequently, it is possible to provide an AGC unit which effectively operates even if the pedestal level in the effective video period is different from the pedestal level in the vertical blanking period.

In the above description, the reference pedestal level output from the ratio determination part 15 is only the pedestal level in the effective video period. The ratio determination part 15 does not output the pedestal level in the vertical blanking period. Because the video level of the luminance signal in the vertical blanking period is the value of 0 IRE (refer to FIG. 5), which does not need to be amplified with accuracy.

As described in the section of Background Art, in the standard video signal, with the pedestal level set to 0 IRE, and the video level in the plus direction, and the synchronizing level in the minus direction, the white level is set at 100 IRE and the sync tip level is set at −40 IRE (refer to FIG. 5b). Furthermore, the sync tip level in the effective video period is set equally to the sync tip level in the vertical blanking period. However, in a nonstandard video signal, there is a case in which a common sync tip level of the effective video period and the vertical blanking period is high than the sync tip level of the standard video signal.

It is an object of the present embodiment to provide an AGC circuit which effectively works for a nonstandard video level having a common sync tip level in the vertical blanking period and the effective video period set to the higher level, e.g., −30 IRE, than the sync tip level of −40 IRE of the standard video signal.

Figure 9:
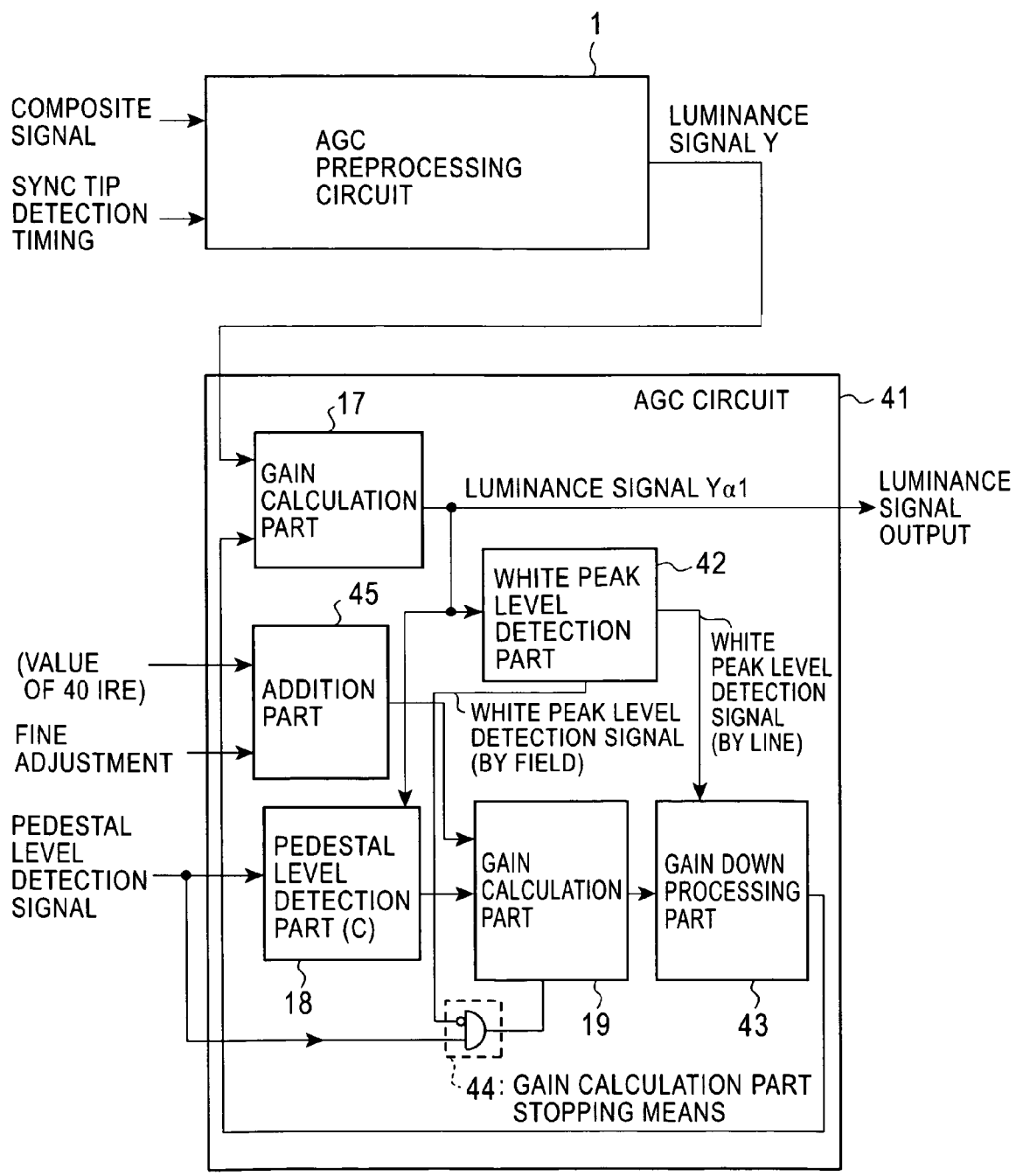
FIG. 9 is a block diagram of an AGC circuit of the second embodiment of the present invention.

FIG. 9 is a block diagram of the second embodiment representing the AGC circuit of the present invention.

As shown in the figure, the AGC circuitry of the second embodiment includes an AGC preprocessing circuit 1 and an AGC circuit 41.

In the figure, like reference numerals with those of the first embodiment are used for similar parts in the AGC circuitry.

The AGC preprocessing circuit 1 receives a composite signal and a sync tip detection signal to output a luminance signal Y. Since the AGC preprocessing circuit 1 used in the AGC unit of the present embodiment is similar to the AGC preprocessing circuit 1 which is described in the first embodiment, the explanation therefor is omitted.

The AGC circuit 41 includes a gain multiplying part 17, a pedestal level detection part (C) 18, a gain calculation part 19, a white peak level detection part 42, a gain down processing part 43, gain calculation stopping means 44, and an addition part 45. The AGC circuit 41 receives the luminance signal Y of which sync tip level is shifted to the value of zero from the AGC preprocessing circuit 1, and then automatically gain-controls the video level of the luminance signal Y to be equal to 100 IRE when both the pedestal levels in the vertical blanking period and the effective video period are higher than the usual pedestal level −40 IRE (e.g., −30 IRE).

Before explaining function of each part, the basic principle of the AGC circuit 41 as a whole is explained.

As described in Background Art, in the standard video signal as shown in FIG. 5B, with the pedestal level set to 0 IRE, the video level in the plus direction, and the synchronizing level in the minus direction, the while level is set al 100 IRE and the sync tip level is set at −40 IRE, respectively.

Figure 1:
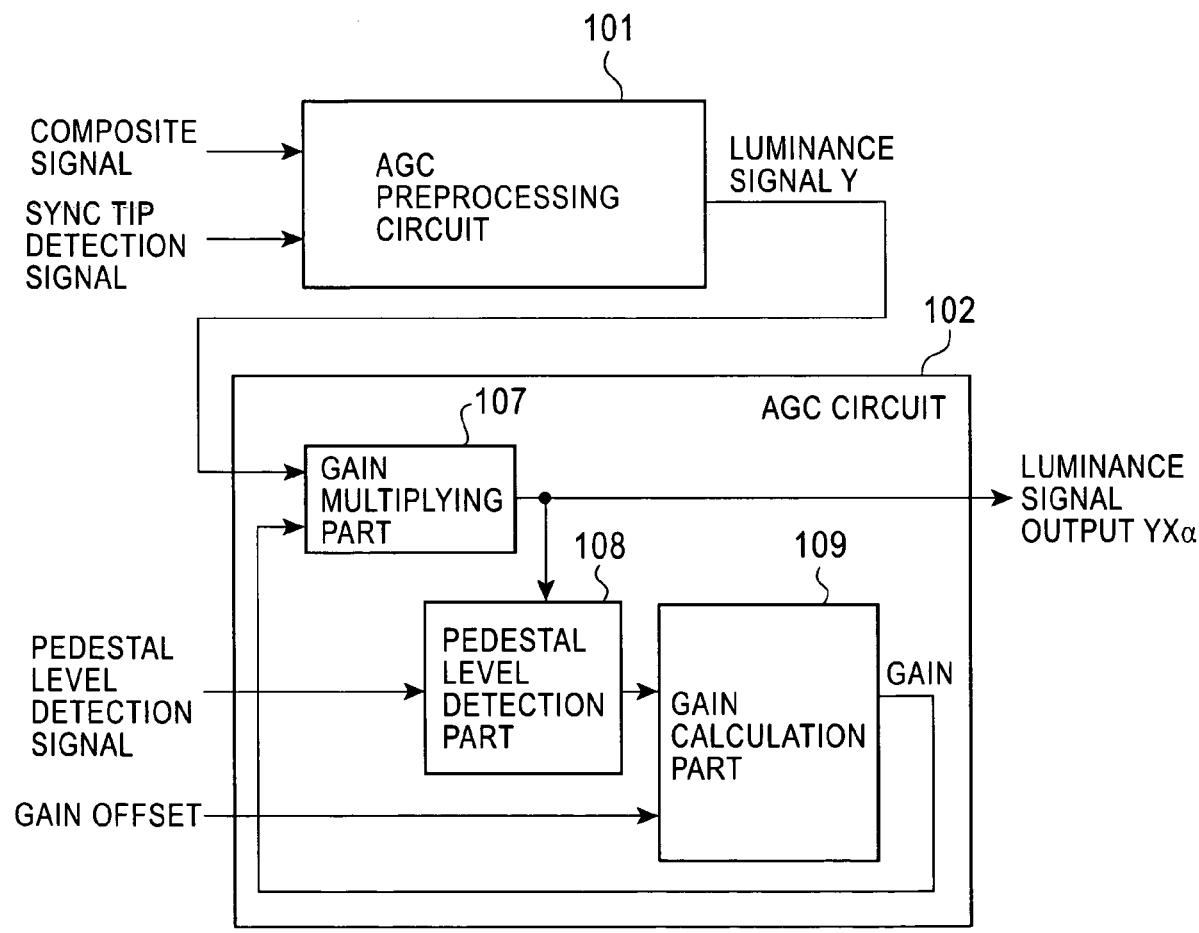
FIG. 1 is a block diagram of a conventional AGC circuitry.
Figure 2:
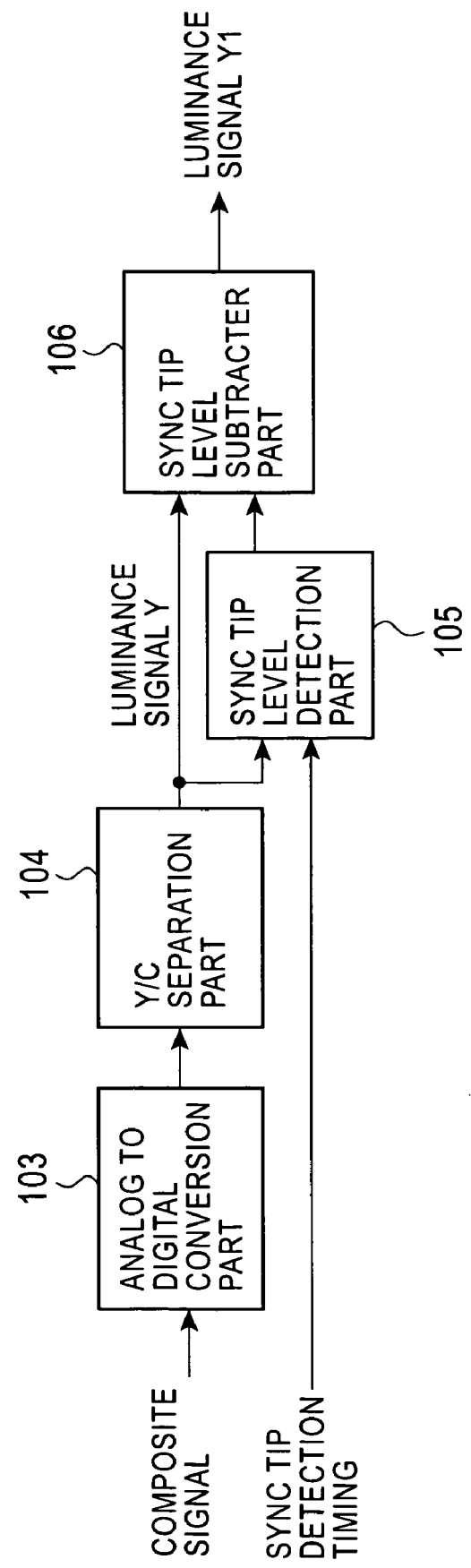
FIG. 2 is a block diagram of a conventional AGC preprocessing circuit.

Thus, if the nonstandard video signal is input to the conventional AGC circuit 102 (refer to FIG. 1), the input signal is multiplied by the amplification factor of 40/30. The nonstandard video signal subject to the present embodiment has the reference pedestal levels in the vertical blanking period and the effective video period, which are higher than the sync tip level of the standard video signal −40 IRE (e.g., −30 IRE). As a result, the ratio between the synchronizing level (refer to FIG. 5B) and the white level (refer to FIG. 5B) will be 30 to 133, which causes the problem that the video level exceeds the value of 100 IRE to be saturated.

In this embodiment, the AGC circuit monitors the white level. The AGC circuit operates in the similar manner as the operation of the AGC circuit 102 (refer to FIG. 1) described in the section of Background Art, unless an saturated level exceeding the value of 100 (hereinafter called a white peak level) is detected in the video level. When the white peak level is detected, the AGC circuit recognizes that a nonstandard video signal is input. The nonstandard video signal has the reference pedestal levels in the vertical blanking period and the effective video period which are higher (e.g. −30 IRE) than the sync tip level of −40 IRE of the standard video signal. By recognizing this, the following operation will be implemented. The function and operation of each part are described below.

First, how each part works and operates before the white peak level is detected is described. The detection of the white peak level is implemented by a white peak level detection part 42, of which details will be described later. The white peak level detection part 42 keeps the gain calculation stopping means 44 on, when the white peak level is not detected.

The gain multiplying part 17 receives the luminance signal Y from the AGC preprocessing circuit 1. The gain multiplying part 17 amplifies the amplitude of the luminance signal $Y\alpha1$-fold and outputs the resultant luminance signal $Y\alpha1$. As will be described below, the luminance signal $Y\alpha1\alpha2$ amplified to the determined level is output as a gain-controlled luminance signal.

The pedestal level detection part (C) 18 receives a pedestal detection signal and detects the pedestal level of the luminance signal $Y\alpha1$, which corresponds to the synchronizing level. Like the method described with referring to FIG. 4, the pedestal level detection part (C) 18 calculates an average of the pedestal level in the luminance signal $Y\alpha1$ N pixels before the reception of the pedestal level detection signal in accordance the timing of the effective video period pedestal level detection signal, and outputs the average of the pedestal level as a pedestal level of the detected luminance signal $Y\alpha1$. The pedestal level of the luminance signal $Y\alpha1$ is transmitted to the gain calculation part 19.

The gain calculation part 19 receives the detected value of the pedestal level from the pedestal level detection part (C) 18, and compares it with the reference pedestal level of 40 IRE received from the addition part 45. The gain calculation part 19 calculates the amplification factor $\alpha2$ to obtain the gain-controlled luminance signal $Y\alpha1\alpha2$ and sends the amplification factor to the gain calculation part 17. In other words, the gain calculation part 19 receives the pedestal level of the luminance signal $Y\alpha1$ to calculate the amplification factor $\alpha2$ for amplifying the received pedestal level to the reference pedestal level, i.e., 40 IRE. By multiplying the luminance signal $Y\alpha1$ by the amplification factor $\alpha2$ determined in this way, the pedestal level of the luminance signal $Y\alpha1\alpha2$ will equal to the pedestal level of the standard video signal. Furthermore, since the ratio between the absolute amounts of the white level and the synchronizing level stays constant, it is assumed that the video level of the luminance signal $Y\alpha1\alpha2$ also equals to the video level of the standard video signal.

Furthermore, if the luminance signal $Y\alpha1$ is just multiplied by the amplification factor $\alpha2$ in the gain multiplying part 17, a rapid change may occur and a screen may be affected. Thus, the amplification factor $\alpha2$ is usually disassembles into the form of $\alpha2=\beta1\cdot\beta2\ldots\beta n$ to amplify the luminance signal $Y\alpha1$ to the luminance signal $Y\alpha1\alpha2$ n times step by step. However, in this embodiment, before the video level equals to the video level of the standard video signal, in other words, if the luminance signal reaches the luminance signal $Y\alpha1\alpha m$ ($\alpha m=\beta1\cdot\beta2\ldots\beta m$), the video level exceeds the value of 100 to be saturated, as described in the explanation of the basic principal. The white peak level is detected by the white peak level detection part 19, which will be described later. How each part works and operates after the white peak level is detected is described below.

The white peak level detection part 42 monitors the luminance signal $Y\alpha1\alpha m$ output from the gain calculation part 17. If the video level is detected to be the white peak level, a white peak level detection signal is transmitted to the gain calculation stopping means 44 and the gain down processing part 43.

Figure 10A:
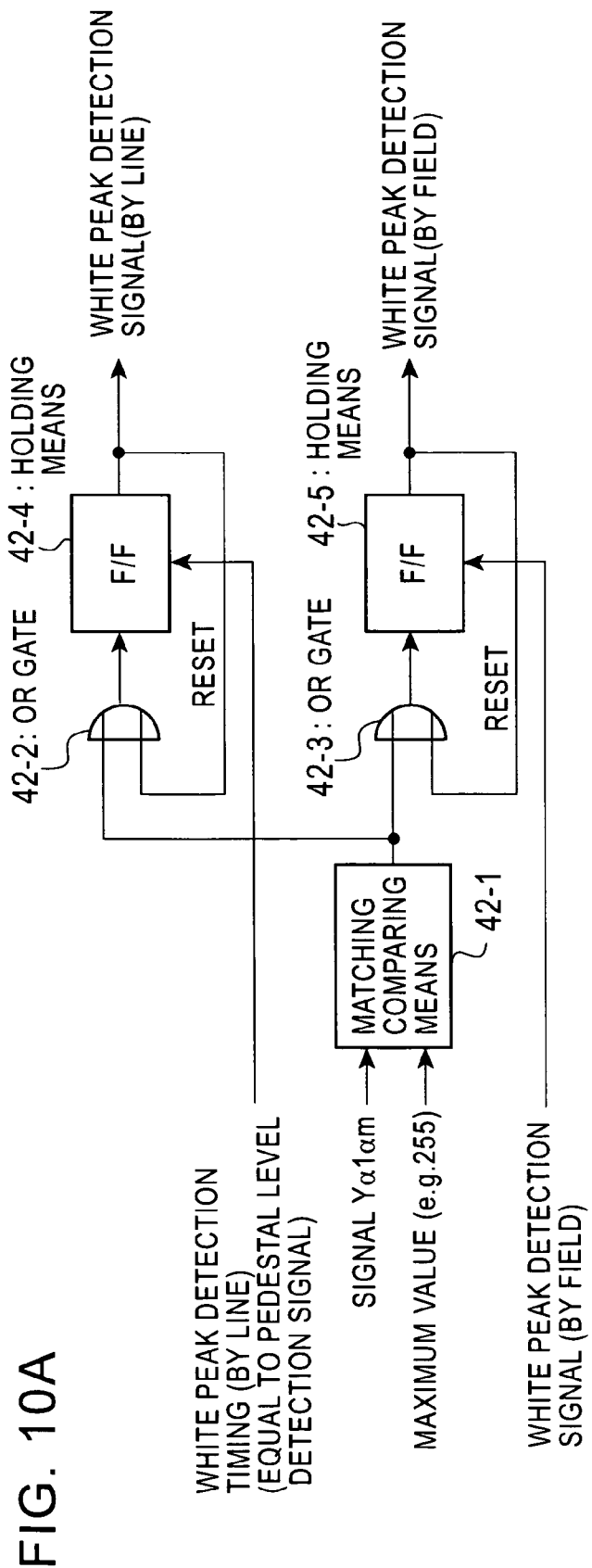
FIGS. 10A and 10B are views explaining the function of a white peak level detection part.
Figure 10B:
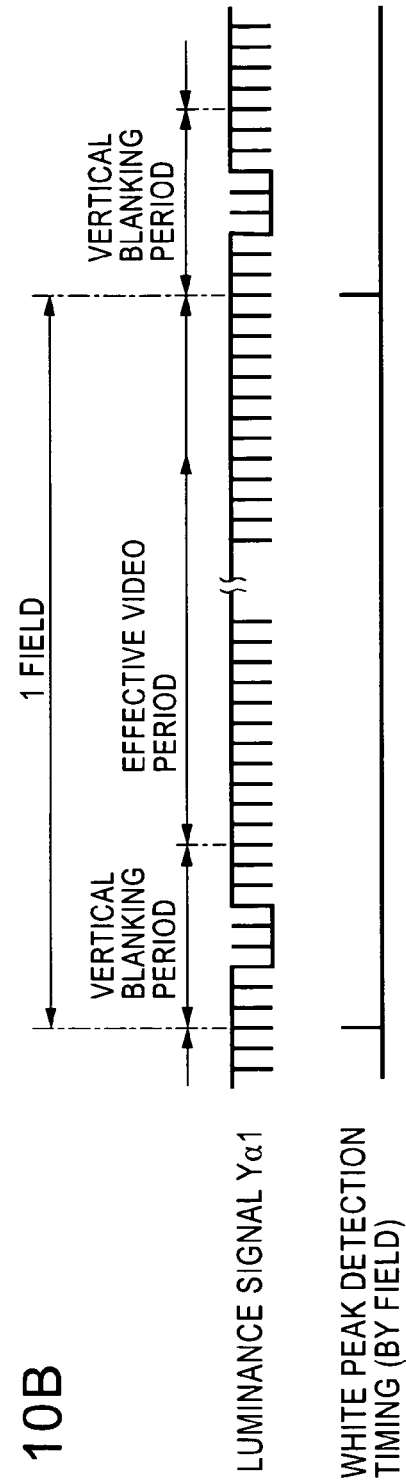

FIGS. 10A and 10B are view explaining the white peak level detection part.

FIG. 10A shows a circuit configuration of the white peak level detection part. FIG. 10B shows the timing of the white peak level detection signal.

As shown in FIG. 10A, matching and comparing means 42-1 receives the luminance signal $Y\alpha1\alpha m$ output from the gain multiplying part 17. When the level of the luminance signal $Y\alpha1\alpha m$ becomes equal to the maximum value of 255, a matching signal (+1) is transmitted to an OR gate 42-2 and an OR gate 42-3. The matching signal (+1) is held by holding means 42-4 and 42-5, and then sent to the gain calculation stopping means 44 and the gain down processing part 43 as a white peak detection signal. The holding means 42-4 is reset by the pedestal level detection signal by each line. The holding means 42-5 is reset by each field. As shown in FIG. 10B, the holding means 42-5 is reset at the beginning of the vertical blanking period.

Returning to FIG. 9, the gain calculation stopping means 44 stops an output of the calculation result by the gain calculation part 19, when the gain calculation stopping means 44 receives the white peak detection signal (+1) which is in field unit from the white peak level detection part 42. In other words, if the white peak level detection part 42 detects a white peak level, the gain calculation part 19 stops the operation thereof while holding a gain output at that instant.

The gain down processing part 43 receives an output, that is the amplification factor $\alpha1\alpha m$, from the gain calculation part 19. The gain down processing part 43 transmits the output to the gain multiplying part 17, if it has not received the white peak detection signal (+1) in line unit (line by line) from the white peak level detection part 42. The gain down processing part 43 transmits the output to the gain multiplying part 17 after the output is attenuated by the predetermined value y, if it has received the white peak detection signal (+1) in line unit.

Figure 11:
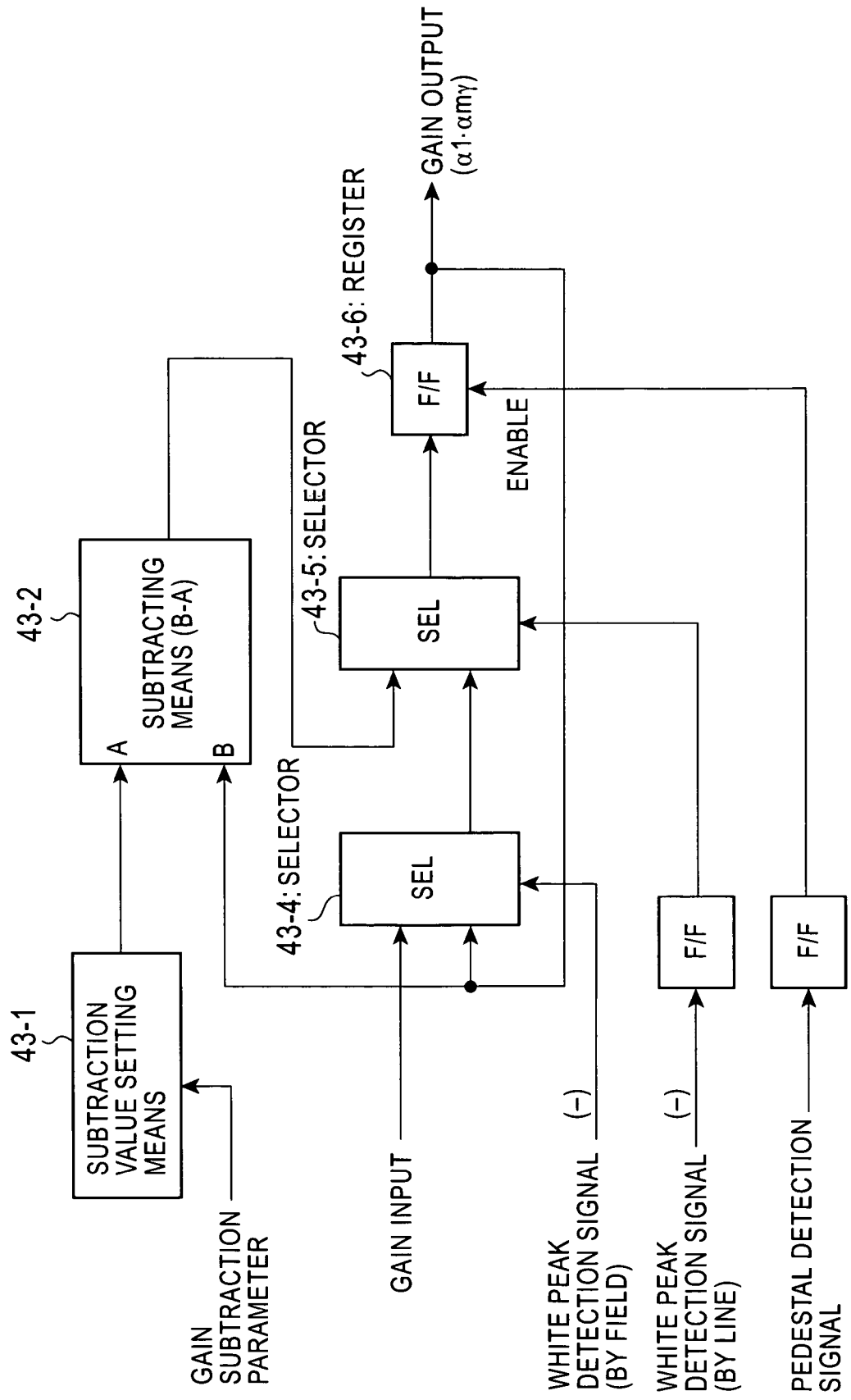
FIG. 11 is a view explaining the function of a gain down processing part.

FIG. 11 is a diagram representing the gain down processing part.

When a selector 43-4 has not received a white peak detection signal in field unit (field by field) from the white peak level detection part 42, in other words, the signal is (−), it directly transmits the output of the gain calculation part 19, that is the amplification factor $\alpha1\alpha m$, to a selector 43-5. When the selector 43-4 has received the white peak detection signal in filed unit, in other words, the signal is (+), it transmits the value held at the resistor 43-6 to the selector 43-5.

When the selector 43-5 has not received the white peak signal by each line, in other words, the signal is (−), it transmits the output from the selector 43-4 to the register 43-6. When the selector 43-5 has received the white peak signal by each line, in other words, the signal is (+), it transmits the output from subtracting means 43-2 to the register 43-6.

The subtracting means 43-2 attenuates the gain of the luminance signal by a prescribed amount $\gamma$ step by step. In other words, if the luminance signal is just multiplied by the gain $\alpha1\alpha m\gamma$ at the gain multiplying part 17, a rapid change may occur and a screen may be affected. Thus, the attenuation amount $\gamma$ is usually disassembles into the form of $\gamma=\gamma1\cdot\gamma2\cdot\gamma3\ldots\gamma n$ to change the luminance signal n times step by step, for transmitting $\alpha1\alpha m\gamma n$ to the selector 43-5.

Subtraction value setting means 43-1 disassembles the attenuation amount $\gamma$ into the form of $\gamma=\gamma1\cdot\gamma2\cdot\gamma3\ldots\gamma n$ to output the it to the subtracting means 43-2.

Since the gain $\alpha1\alpha m\gamma n$ is multiplied by degrees at the gain multiplying part 17, the video level of the luminance signal $\alpha1\alpha m\gamma n$ is attenuated step by step. When the gain is $\alpha1\alpha m\gamma m$, the white peak level detection part 42 ceases to detect the white peak level. In this case, the procedure of the AGC circuit 41 moves back to the procedure before the white peak level is detected. In other words, the AGC circuit of the present embodiment automatically implements a gain-control by repeating the procedures before and after the detection of the white peak level as described above.

According to the present embodiment, there is provided an AGC circuit having a white peak level detection part and a gain down processing part, which effectively operates corresponding to a nonstandard video signal of which sync tip level common to the vertical blanking period and the effective video period is set to a higher level than the sync tip level of the standard video signal of −40 IRE. The white peak level detection part monitorss the luminance signal $Y\alpha1\alpha m$ output from the gain multiplying part, and outputs a white peak level detection signal if the video level is at the white peak level. The gain down processing part receives an output ($\alpha1\alpha m$) from the gain calculation part, and directory transmits it to the gain calculation part if the white peak level detection signal in line unit (+1) has not been received from the white peak level detection part, and transmits it after attenuating it by a determined value (γ) to the gain multiplying part 17 if the white peak level detection signal in line unit (+1) has been received.

According to the second embodiment, there is provided an AGC circuit which can process a video signal in which the sync tip levels in the vertical blanking period and the effective video period are set to be equal, but the both are higher than the sync tip level of a standard video signal. However, in the second embodiment, a problem may be caused that the upper part of the screen is rather bright while the lower part being rather dark, since the luminance signal is gradually attenuated line by line after the white peak level is detected.

In the third embodiment, the AGC circuit of the second embodiment is used for lowering a gain step by step. However, the luminance signal is not attenuated in the course of lowering the gain, and the gain is once held at the memory to be accumulated thereto. After the gain is completely set to the memory, the gain held in the memory is multiplied in all the lines in the subsequent field. Furthermore, the gain held in the memory is updated field by field.

Figure 12:
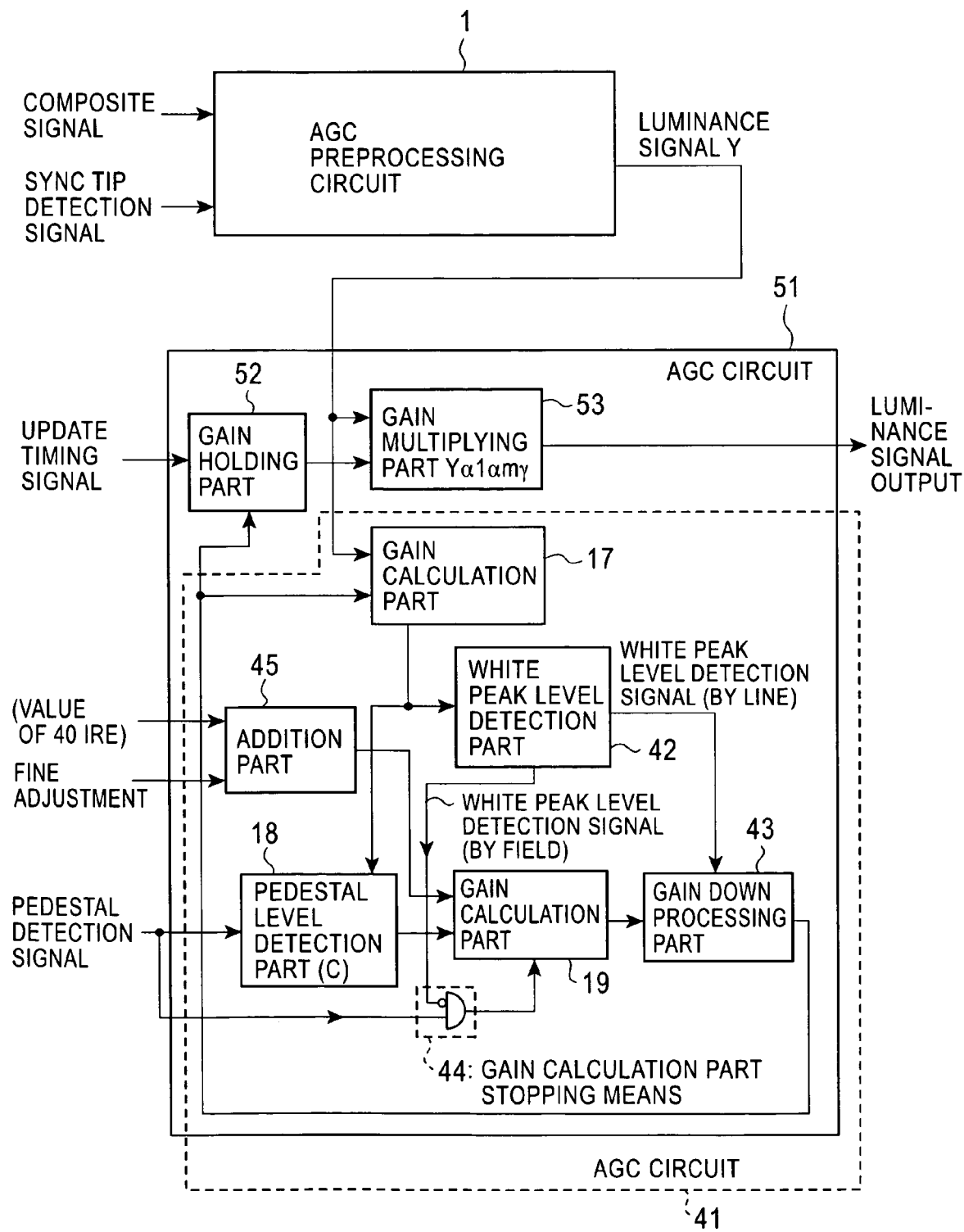
FIG. 12 is a block diagram of an AGC circuit of the third embodiment of the present invention.

FIG. 12 is a block diagram of a third embodiment representing the AGC unit of the present invention.

As shown in the figure, the AGC unit of the third embodiment includes an AGC preprocessing circuit 1 and an AGC circuit 51.

In the figure, like reference numerals are used to denote similar parts in the first and the second embodiments.

The AGC preprocessing circuit 1 receives a composite signal and a sync tip detection signal to output a luminance signal Y. Since the AGC preprocessing circuit 1 of the AGC unit of the present embodiment is similar to the AGC preprocessing circuit 1 which is described in the first embodiment and Background Art, the explanation for it is omitted.

The AGC circuit 51 includes a gain multiplying part 17, a pedestal level detection part (C) 18, a gain calculation part 19, a white peak level detection part 42, a gain down processing part 43, gain calculation stopping means 44, an adding part 45, a gain holding part 52, and a gain multiplying part 53. The AGC circuit 51 receives the luminance signal Y of which sync tip level is shifted to the value of zero from the AGC preprocessing circuit 1, and automatically gain controls the video level of the luminance signal Y so as to make it 100 IRE when both sync tip levels in the vertical blanking period and the effective video period are less than the usual pedestal level of 40 IRE, e.g., 30 IRE.

Only the differences between this embodiment and the first and the second embodiments will be described.

As shown in the figure, the AGC circuit 51 of the present embodiment has a constitution that a gain holding part 52 and a gain multiplying part 53 are added to the AGC circuit 41 of the second embodiment.

The gain holding part 52 receives an output gain from the gain down processing part 43, and accumulates and holds the output gain to transmit it (an amplification factor α1 αmγm) to the gain multiplying part 53 in matching with the reception of an updating signal, i.e., a start timing of a field.

The gain multiplying part 53 receives a luminance signal Y of which sync tip level is shifted to the value of zero from the AGC preprocessing circuit 1, and adds (i.e., multiplying by the amplification factor) an output gain received from the gain holding part 52 to output the luminance signal auto-gain-controlled.

By having such a configuration described above, the gain is gradually lowered line by line. However, without attenuating the luminance signal in the field, the gain is once accumulated to the memory to be held. In the subsequent field, the gain held in the memory is multiplied in all the lines. As a result, at the same time as the effect by the second embodiment, this embodiment enjoys an additional effect to avoid the problem that the upper part of the screen is rather bright while the lower part being rather dark.

In a fourth embodiment, it is an object to provide an AGC circuit which can process all of the standard video signals which may be used in the first, second, and third embodiments.

Figure 13:
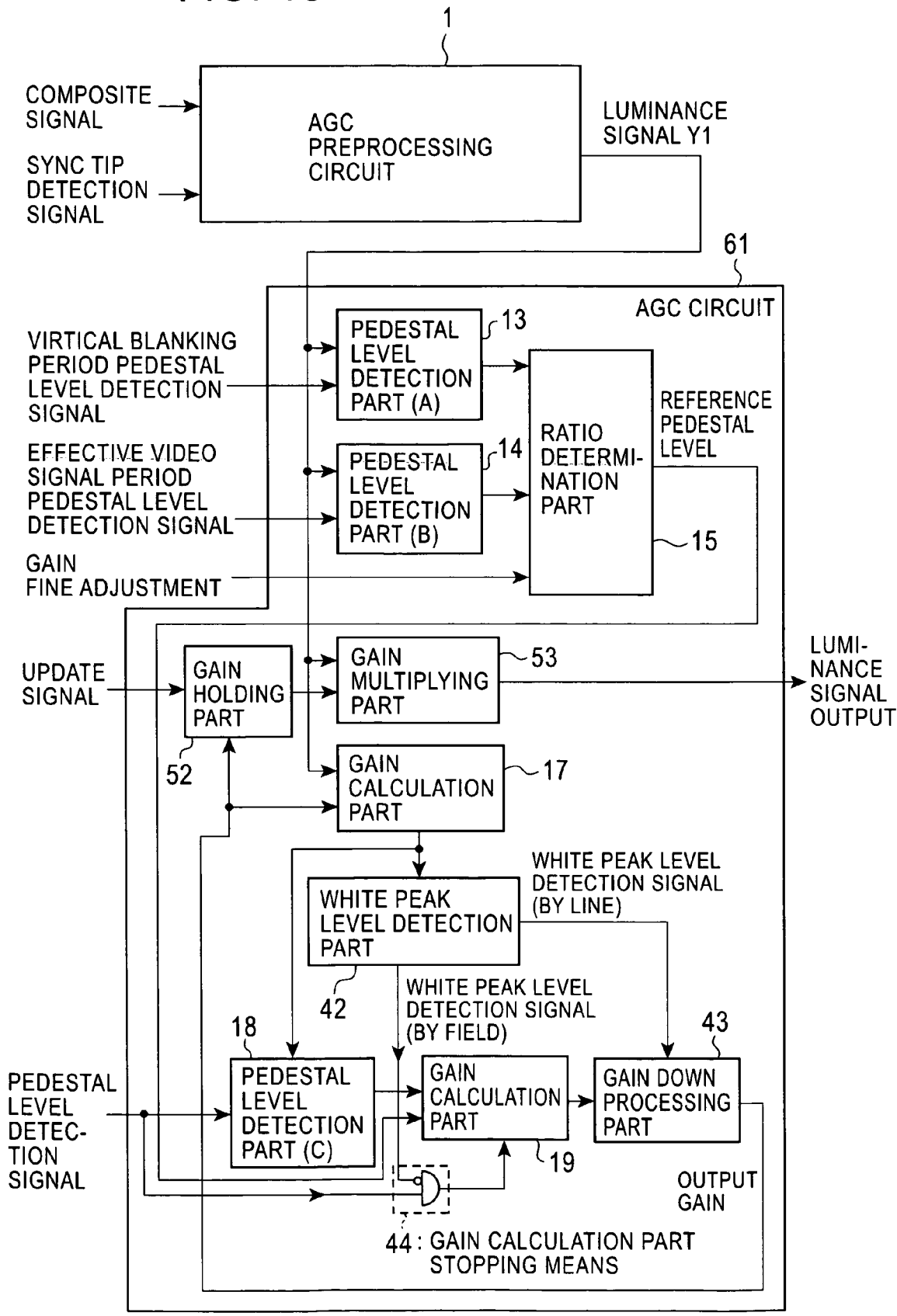
FIG. 13 is a block diagram of a gain control circuit of the forth embodiment of the present invention.

FIG. 13 is a block diagram representing a gain control circuit of the forth embodiment.

As shown in the figure, the AGC unit of the forth embodiment includes the AGC preprocessing circuit 1 and an AGC circuit 61.

The AGC preprocessing circuit 1 receives a composite signal and a sync tip detection signal to output a luminance signal Y. In the figure, the like reference numerals are used to denote similar parts of the first, the second and the third embodiments.

The AGC preprocessing circuit 1 receives a composite signal and a sync tip detection signal to output a luminance signal Y since the AGC preprocessing circuit 1 used in the AGC unit of the present embodiment is similar to the AGC preprocessing circuit 1 which is described in the description of the first to third embodiments and the description of the Background Art, the explanation of it is omitted.

The AGC circuit 61 includes a pedestal level detection part (A) 13, a pedestal level detection part (B) 14, a ratio determination part 15, a gain multiplying part 17, a pedestal level detection part (C) 18, a gain calculation part 19, a white peak level detection part 42, a gain down processing part 43, gain calculation stopping means 44, a gain holding part 52, and a gain multiplying part 53. The AGC circuit 61 receives the luminance signal Y of which sync tip level is shifted to the value of zero from the AGC preprocessing circuit 1, and automatically gain controls so as to control the video level of the luminance signal Y of the standard video signal which may be used in the first, second and the third embodiments to be at 100 IRE.

Only the difference between the present embodiment and the first, second, or third embodiment is described.

As shown in the figure, the AGC circuit 61 of the present embodiment transmits the output from the ratio determination part 15 in the AGC preprocessing circuit 1 (FIG. 6) of the first embodiment as substitute for the reference pedestal level to the gain calculation part 19 in the AGC circuit 51 (FIG. 12).

In such an arrangement, for example, it is assumed that the AGC circuit 61 accepts a video signal of which ratio between the synchronizing level and the video level in the vertical blanking period is 40 to 100, and of which ratio between the synchronizing level and the video level in the effective video period is 30 to 100. At this time, the ratio determination part 15 would operate to set the reference synchronizing level at 30 IRE. However, if the white level detection part 42 detects the white peak level, the gain calculation part 19 stops a new output during one field, and the gain down processing part 43 attenuates the output from the gain calculating part 19, i.e., a gain value, by degrees.

Each time the white peak level detection part 42 detects a white peak level by each line, the gain value goes down. The white peak level ceases to be detected at a certain line. The gain value at this line is held at gain holding part 52. This gain value is multiplied by the luminance signal at the gain multiplying part 53. Moreover, the gain value held at the gain holding part 52 is updated at each field. In this manner, if the white level detection part 42 does not detect the white peak level, the ratio determination part 15 operates to set the reference synchronizing level to 30 IRE. If the white level detection part 42 detects the white peak level, the gain value is attenuated in the gain down processing part 43. Thus, a more stabled luminance signal could be output from the AGC circuit than from the AGC circuit of the first embodiment, when a similar video signal is received.

As described above, the AGC unit has a constitution in which, an output from the ratio determination part 15 in the AGC preprocessing circuit (FIG. 6) of the first embodiment is transmitted as a substitute for the reference pedestal level to the gain calculation part 19 in the AGC circuit 51 (FIG. 12) of the third embodiment. Having such an arrangement, an effect is that it is possible to realize an AGC circuitry which can process all types of a nonstandard video signal, which may be used in the first, second, and third embodiment.

The AGC circuitry of the present invention can be applied to all types of digital video apparatus, e.g., both a digital video tape recorder and a digital color television set.

This application is based on Japanese Patent Application No. 2004-044118 which is herein incorporated by reference.

What is claimed is:

1. An automatic gain control circuitry for receiving a video signal, detecting a synchronizing level of said video signal, amplifying said synchronizing level until said synchronizing level reaches a reference synchronizing level, and outputting a luminance signal having a predetermined video level comprising:

a vertical blanking period pedestal level detection part for detecting said synchronizing level in a vertical blanking period of said video signal;

an effective video period pedestal level detection part for detecting said synchronizing level in an effective video period;

a ratio determination part for obtaining a ratio between a value detected by said vertical blanking period pedestal level detection part and the value detected by said effective period pedestal level detection part, for outputting a value which is obtained by multiplying a standard value of said synchronizing level in said vertical blanking period to said ratio as a said reference synchronizing level.

2. The automatic gain control circuit according to claim 1, wherein said ratio determination part includes:

a plurality of dividing means for disassembling said value detected by said vertical blanking period pedestal level detection part into a plurality of stages respectively having determined differences of a level, and for outputting said value at said plurality of stages;

a plurality of comparing means for comparing respective outputs from said plurality of dividing means with said detected value by said effective video period pedestal level detection part and for outputting comparison results thereof;

determining means for determining a ratio between said value detected by said vertical blanking period pedestal level detection part and said value detected by said effective video period pedestal level detection part;

adding means for multiplying said ratio determined by said determining means by the standard value of the synchronizing level in said vertical blanking period.

3. The automatic gain control circuit according to claim 1 further comprising:

a white peak level detection part for monitoring a video level of said luminance signal and for outputting a white peak detection signal in synchronism with a field and a line when said video level reaches a saturating state; and a gain down processing part for outputting a predetermined attenuating amount to attenuate said video level when said white peak level is received;

a gain holding part for adding and holding an attenuating amount output from said gain down processing part in synchronization with said line, and determining an attenuating amount of said luminance signal for each field.

4. The automatic gain control circuit according to claim 2 further comprising:

a white peak level detection part for monitoring a video level of said luminance signal and for outputting a white peak detection signal in synchronism with a field and a line when said video level reaches a saturating state;

a gain down processing part for outputting a predetermined attenuating amount to attenuate a video level when said white peak level is received;

a gain holding part for adding and holding an attenuating amount output from said gain down processing part in synchronization with said line, and determining an attenuating amount of said luminance signal being for each field.

* * * * *